(12) United States Patent
Nishida

(10) Patent No.: US 11,565,756 B2
(45) Date of Patent: Jan. 31, 2023

(54) VEHICLE

(71) Applicant: HONDA MOTOR CO., LTD., Tokyo (JP)

(72) Inventor: Makoto Nishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 16/881,022

(22) Filed: May 22, 2020

(65) Prior Publication Data

US 2020/0385061 A1 Dec. 10, 2020

(30) Foreign Application Priority Data

May 28, 2019 (JP) .............................. JP2019-099262

(51) Int. Cl.
*B62D 21/00* (2006.01)
*B62D 21/15* (2006.01)
*B60K 1/00* (2006.01)
*B60L 50/60* (2019.01)

(52) U.S. Cl.
CPC .............. *B62D 21/155* (2013.01); *B60K 1/00* (2013.01); *B60K 2001/001* (2013.01); *B60L 50/60* (2019.02)

(58) Field of Classification Search
CPC ...... B62D 21/155; B62D 21/03; B62D 21/11; B60K 1/00
See application file for complete search history.

(56) References Cited

U.S. PATENT DOCUMENTS

| | | | |
|---|---|---|---|
| 6,276,484 B1 * | 8/2001 | Evans | B60K 5/1275 180/291 |
| 6,478,106 B2 * | 11/2002 | Hawener | B62D 21/11 180/382 |
| 8,813,883 B2 * | 8/2014 | Fujiwara | B60K 6/46 180/312 |

(Continued)

FOREIGN PATENT DOCUMENTS

| | | |
|---|---|---|
| CN | 103101423 | 5/2013 |
| CN | 104157805 | 11/2014 |

(Continued)

OTHER PUBLICATIONS

Japanese Office Action for Japanese Patent Application No. 2019-099262 dated Jan. 19, 2021.

(Continued)

*Primary Examiner* — Hau V Phan
(74) *Attorney, Agent, or Firm* — Amin, Turocy & Watson, LLP

(57) ABSTRACT

A vehicle of an embodiment includes a driving device including a rotating electric machine, a case configured to accommodate the rotating electric machine and a PCU that is disposed on a side opposite to a side at which a load is input when the vehicle collides with an object, that is disposed in front of the case and that is configured to supply electric power to the rotating electric machine, a support section that is provided in the driving device and that is configured to come in contact with a vehicle body frame of the vehicle, and an impact attenuating section that is provided on the support section and that is configured to attenuate an impact when the vehicle collides with an object.

9 Claims, 7 Drawing Sheets

(56) References Cited

U.S. PATENT DOCUMENTS

| | | | | |
|---|---|---|---|---|
| 8,851,223 | B2* | 10/2014 | Yamashita | B60K 1/00 180/300 |
| 9,010,479 | B2* | 4/2015 | Kambayashi | B60K 1/00 180/297 |
| 9,233,716 | B2* | 1/2016 | Midoun | B62D 21/152 |
| 9,296,427 | B1* | 3/2016 | Kim | B62D 25/082 |
| 9,764,644 | B2* | 9/2017 | Nishida | B60L 3/00 |
| 10,035,415 | B1* | 7/2018 | Koch | F02M 37/0017 |
| 10,246,132 | B2* | 4/2019 | Leier | B60K 1/00 |
| 2011/0132672 | A1* | 6/2011 | Niina | B60K 5/1241 903/902 |
| 2012/0292124 | A1* | 11/2012 | Yamashita | B62D 21/155 180/291 |
| 2012/0320528 | A1* | 12/2012 | Akiyama | H05K 7/20927 361/689 |
| 2015/0353136 | A1* | 12/2015 | Kramer | B62D 21/11 29/469 |
| 2018/0201323 | A1* | 7/2018 | Onoda | B62D 21/03 |

FOREIGN PATENT DOCUMENTS

| | | |
|---|---|---|
| JP | 2004-175301 | 6/2004 |
| JP | 2009-286304 | 12/2009 |
| JP | 2012-166653 | 9/2012 |
| JP | 2015-054612 | 3/2015 |
| JP | 2017-007549 | 1/2017 |
| JP | 2018-052209 | 4/2018 |
| JP | 2019-151174 | 9/2019 |

OTHER PUBLICATIONS

Chinese Office Action for Chinese Patent Application No. 202010342418.6 dated Sep. 23, 2022.

* cited by examiner

VEHICLE

CROSS-REFERENCE TO RELATED APPLICATION

Priority is claimed on Japanese Patent Application No. 2019-099262, filed May 28, 2019, the content of which is incorporated herein by reference.

BACKGROUND OF THE INVENTION

Field of the Invention

The present invention relates to a vehicle.

Description of Related Art

In a vehicle such as a hybrid automobile, an electric automobile, or the like, a configuration that protects vehicle parts such as a battery and the like upon collision is known. For example, Japanese Unexamined Patent Application, First Publication No. 2004-175301 discloses a configuration that protects a battery part configured to generate electric power from damage upon collision in an electric automobile in which the battery part is installed in the front of the vehicle. The electric automobile includes a battery part and an electric power control unit (PCU) disposed above the battery part. The PCU includes a protruding section that protrudes forward than an edge of the battery part. When the electric automobile collides with an external object from the front, an external plate of a vehicle body collides with the protruding section of the PCU disposed in front of the battery part, and an impact force is transmitted to the PCU.

SUMMARY OF THE INVENTION

However, when the PCU receives a greater force than expected, there is a possibility of damage to a housing of the PCU, a short circuit of an electric circuit, or the like occurring.

In addition, since the battery part and the PCU are arranged in a vertical direction (a height direction) of the vehicle, a height of an assembly of the battery part and the PCU may increase and a wide disposition may be required.

An aspect of the present invention is directed to providing a vehicle capable of reducing a height of a driving device while attenuating an impact to an electric power conversion device upon vehicle collision.

(1) A vehicle according to an aspect of the present invention includes a driving device including: a rotating electric machine, a case configured to accommodate the rotating electric machine and an electric power conversion device that is disposed on a side opposite to a side at which a load is input when the vehicle collides with an object, that is disposed in front of or behind the case and that is configured to supply electric power to the rotating electric machine; a support section that is provided in the driving device and that is configured to come in contact with a vehicle body of the vehicle; and an impact attenuating section that is provided on the support section and that is configured to attenuate an impact when the vehicle collides with an object.

(2) In the aspect of the above-mentioned (1), the vehicle body may include a receiving section configured to receive an impact from the support section when the vehicle collides with an object, and the receiving section may be disposed at a position facing the support section.

(3) In the aspect of the above-mentioned (2), the support section may extend closer to the receiving section than the electric power conversion device while being connected to the driving device.

(4) In the aspect of the above-mentioned (1), the impact attenuating section may be a bent section that is provided in an intermediate section of the support section and that is plastically deformable by the impact.

(5) In the aspect of the above-mentioned (1), the support section may include: a first configuration section extending from the driving device to an intermediate section of the support section; and a second configuration section extending downward from the intermediate section configured to receive a load in a horizontal direction.

(6) In the aspect of the above-mentioned (2), the vehicle may have a space section provided below the receiving section and into which the electric power conversion device is retractable.

(7) In the aspect of the above-mentioned (1), the driving device may be disposed in a power source accommodating section provided in a front section or a rear section of the vehicle, and the power source accommodating section may be a space between left and right side frames of the vehicle.

(8) In the aspect of the above-mentioned (1), the driving device may be disposed in a power source accommodating section provided in a rear section of the vehicle, and the electric power conversion device may be disposed in front of the case.

(9) In the aspect of the above-mentioned (8), the case may include: a housing configured to accommodate the rotating electric machine; and a gear box configured to accommodate a gear mechanism, and the gear box may protrude rearward than the housing.

(10) In the aspect of any one of the above-mentioned (1) to (9), the rotating electric machine and the electric power conversion device may be integrally coupled to each other.

According to the aspect of the above-mentioned (1), since the support section provided in the driving device and able to come in contact with the vehicle body and the impact attenuating section provided in the support section and configured to attenuate an impact when the vehicle collides with an object are provided, an impact to the driving device upon collision of the vehicle can be attenuated. In addition, since the driving device includes the electric power conversion device disposed at the side opposite to the side at which a load is input when the vehicle collides with an object, it is possible to prevent the load from being directly input to the electric power conversion device upon collision of the vehicle. In addition, since the electric power conversion device is disposed in front of or behind the case, in comparison with the case in which the case and the electric power conversion device are arranged in the vertical direction of the vehicle, the height of the driving device can be reduced. Accordingly, the height of the driving device can be reduced while an impact to the electric power conversion device upon collision of the vehicle can be attenuated.

According to the aspect of the above-mentioned (2), since the vehicle body includes the receiving section configured to receive an impact from the support section when the vehicle collides with an object and the receiving section is disposed at a position facing the support section, the following effects are exhibited.

Since the impact attenuating section can be actively deformed upon collision of the vehicle, an impact upon collision of the vehicle can be attenuated more.

According to the aspect of the above-mentioned (3), since the support section extends closer to the receiving section than the electric power conversion device while being connected to the driving device, the following effects are exhibited.

It is possible to prevent the electric power conversion device from colliding with the vehicle body upon collision of the vehicle.

According to the aspect of the above-mentioned (4), since the impact attenuating section is the bent section provided in the intermediate section of the support section and plastically deformable by the impact, the following effects are exhibited.

Since the bent section is actively plastically deformed upon collision of the vehicle and an impact is absorbed by the plastic deformation of the bent section, the impact upon collision of the vehicle can be attenuated more.

According to the aspect of the above-mentioned (5), since the support section includes the first configuration section extending from the driving device to the intermediate section of the support section and the second configuration section extending downward from the intermediate section and configured to receive a load in the horizontal direction, the following effects are exhibited.

Since the load in the horizontal direction is input to the second configuration section upon collision of the vehicle, the impact upon collision of the vehicle can be attenuated more. In addition, since the load in the horizontal direction is input to the second configuration section upon collision of the vehicle, when the driving device is rotated and displaced downward, it is possible to prevent the driving device from colliding with the vehicle body.

According to the aspect of the above-mentioned (6), since the vehicle has the space section provided below the receiving section and into which the electric power conversion device is retractable, the following effects are exhibited. When the driving device is rotated and displaced downward upon collision of the vehicle, since the electric power conversion device is retracted into the space section, the electric power conversion device can be protected from the impact.

According to the aspect of the above-mentioned (7), since the driving device is disposed in the power source accommodating section provided in the front section or the rear section of the vehicle and the power source accommodating section is the space between the left and right side frames of the vehicle, the following effects are exhibited.

Since the driving device is disposed in the space between the left and right side frames of the vehicle, a wide luggage room and a wide cabin can be secured. In addition, it is possible for the left and right side frames to protect the driving device from side collision.

According to the aspect of the above-mentioned (8), since the driving device is disposed in the power source accommodating section provided in the rear section of the vehicle and the electric power conversion device is disposed in front of the case, the following effects are exhibited. In comparison with the case in which the driving device is provided in the front section of the vehicle, a weight balance of front and rear tires when a driver enters the vehicle becomes better. In addition, when the vehicle collides with an external object from the rear, it is possible to prevent the load from being directly input to the electric power conversion device.

According to the aspect of the above-mentioned (9), since the case includes the housing configured to accommodate the rotating electric machine and the gear box configured to accommodate the gear mechanism and the gear box protrudes rearward from the housing, the following effects are exhibited.

When the vehicle collides with an external object from the rear, since a load can be received by the gear box, it is possible to prevent the load from being directly input to the electric power conversion device.

According to the aspect of the above-mentioned (10), since the rotating electric machine and the electric power conversion device are integrally coupled to each other, the following effects are exhibited.

Since the rotating electric machine and the electric power conversion device can be connected by a DC line through electric/mechanical integrated structure, in comparison with the case in which the rotating electric machine and the electric power conversion device are connected by a three-phase line, it contributes to reduction in costs.

DETAILED DESCRIPTION OF THE INVENTION

Figure 1:
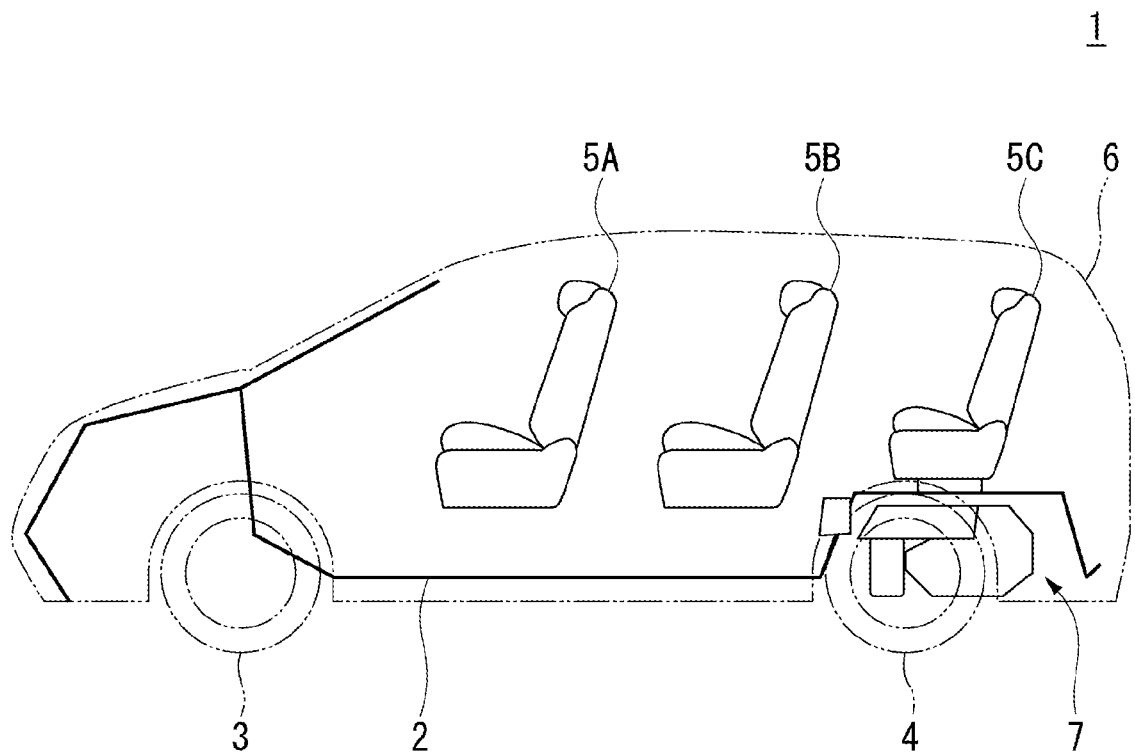
FIG. 1 is a left side view of a vehicle according to an embodiment.

Hereinafter, an embodiment of the present invention will be described with reference to the accompanying drawings. In the embodiment, a vehicle such as a hybrid automobile, an electric automobile, or the like will be exemplarily described. Directions of forward, rearward, leftward, rightward, and so on, in the following description are the same as directions in a vehicle described below unless the context clearly indicates otherwise. In appropriate places in the drawings used in the following description, an arrow FR indicates a forward direction with respect to a vehicle, an arrow LH indicates a leftward direction with respect to the vehicle, an arrow UP indicates an upward direction with respect to the vehicle, and a line CL indicates a lateral center of a vehicle body.

<Entire Vehicle>

FIG. 1 is a left side view of a vehicle 1 according to the embodiment.

As shown in FIG. 1, the vehicle 1 includes a vehicle body frame 2 (a vehicle body) that constitutes a skeleton of the vehicle 1, front wheels 3 provided on left and right sides of a front section of the vehicle 1, rear wheels 4 provided on left and right sides of a rear section of the vehicle 1, a plurality of seats 5A to 5C disposed in a cabin of the vehicle 1, exterior parts 6 of the vehicle 1, and a driving device disposition structure 7 disposed in the rear section of the vehicle 1.

Figure 2:
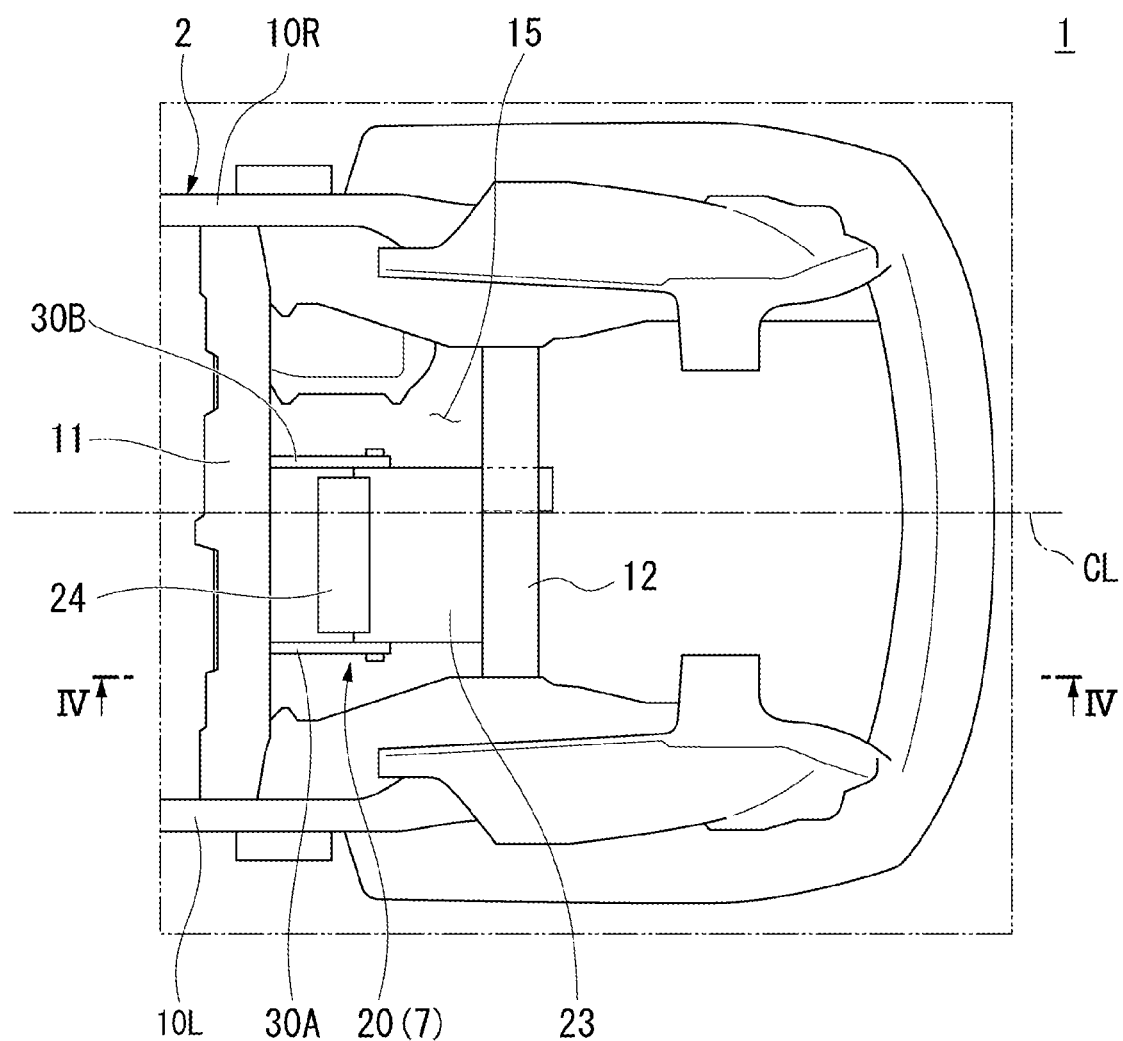
FIG. 2 is a plan view of a rear section of the vehicle according to the embodiment.

As shown in FIG. 2, the vehicle body frame 2 includes a pair of left and right side frames 10L and 10R extending in a forward/rearward direction, and a plurality of cross frames extending in a vehicle width direction and configured to connect the pair of left and right side frames 10L and 10R.

Each of the plurality of cross frames includes a cross member 11 disposed at a longitudinal central section of the vehicle, and a subsidiary frame 12 disposed behind the cross member 11.

For example, the front wheels 3 function as steered wheels.

For example, the rear wheels 4 function as driving wheels.

As shown in FIG. 1, the three seats 5A to 5C are disposed at intervals in the forward/rearward direction. The three seats 5A to 5C include a first seat 5A including a driver's seat, a second seat 5B disposed behind the first seat 5A, and a third seat 5C disposed behind the second seat 5B.

<Driving Device Disposition Structure 7>

The driving device disposition structure 7 is disposed below a floor (under the floor) of the vehicle 1. The driving device disposition structure 7 is disposed below the third seat 5C. As shown in FIG. 2, the driving device disposition structure 7 includes a driving device 20 configured to drive the vehicle 1, and brackets 30A and 30B provided on the driving device 20.

<Driving Device 20>

The driving device 20 is disposed in a power source accommodating section 15 provided in the rear section of the vehicle 1. The power source accommodating section 15 is a space between the left and right side frames 10L and 10R of the vehicle 1. The driving device 20 is supported by the subsidiary frame 12.

Figure 3:
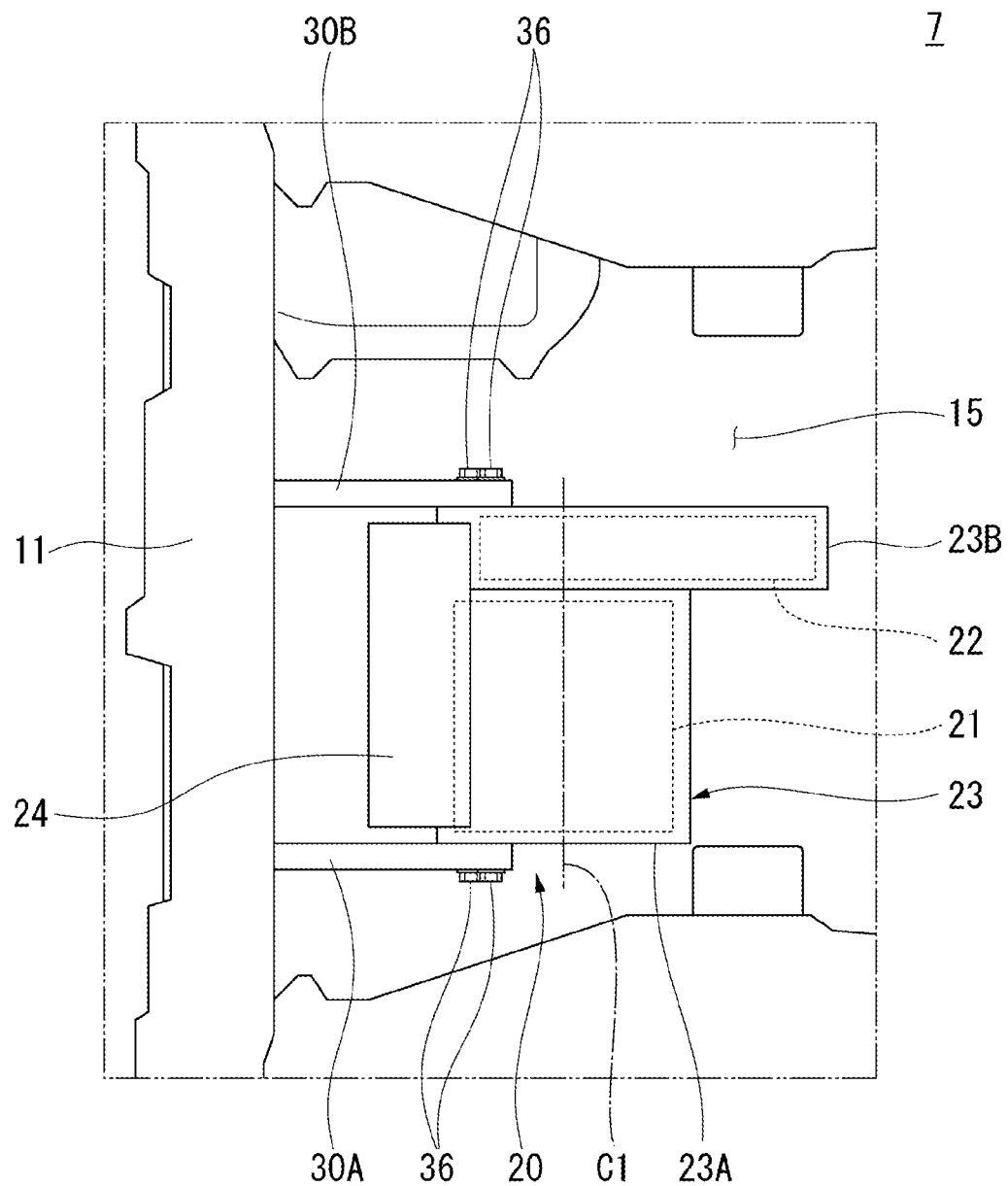
FIG. 3 is an enlarged view of a major part in FIG. 2.

As shown in FIG. 3, the driving device 20 includes a rotating electric machine 21, a gear mechanism 22 (a power transmission mechanism) configured to transmit power of the rotating electric machine 21 to the wheels, a case 23 configured to accommodate the rotating electric machine 21, and an electric power conversion device (PCU) 24 configured to supply electric power to the rotating electric machine 21.

The rotating electric machine 21 is a power source of the vehicle 1. For example, the rotating electric machine 21 includes a rotor and a stator (not shown). The rotating electric machine 21 has a rotary axis C1 substantially parallel to the vehicle width direction. That is, the rotating electric machine 21 is a so-called horizontal type in which the rotary axis C1 is in the vehicle width direction.

The gear mechanism 22 has a plurality of gears (not shown) meshed with each other. For example, the gear mechanism 22 transmits power of the rotating electric machine 21 to the rear wheels 4 (see FIG. 4) serving as driving wheels.

Figure 5:
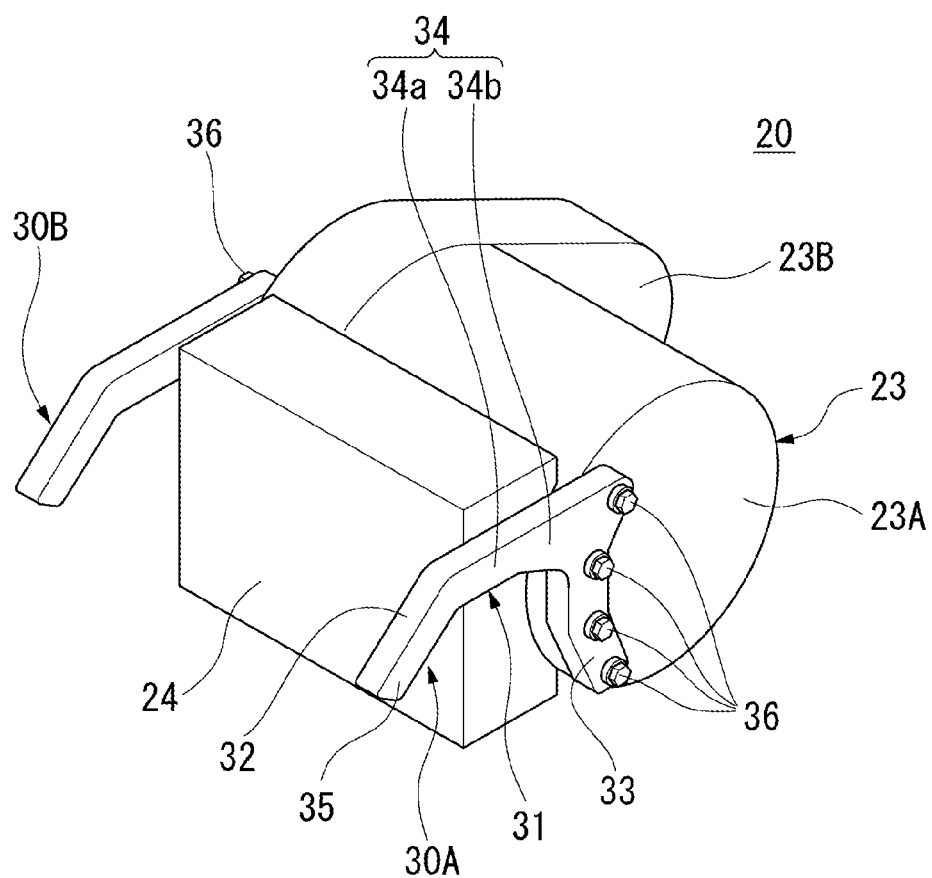
FIG. 5 is a perspective view of a driving device of the embodiment.

The case 23 accommodates the rotating electric machine 21 and the gear mechanism 22. The case 23 includes a housing 23A configured to accommodate the rotating electric machine 21, and a gear box 23B configured to accommodate the gear mechanism 22. The housing 23A and the gear box 23B are integrally coupled to each other in the vehicle width direction. The housing 23A has a cylindrical shape larger than that of the rotating electric machine 21 (see FIG. 5). The gear box 23B protrudes rearward from the housing 23A. The gear box 23B has a shape protruding from the housing 23A toward a rear wheel axle (not shown) while overlapping the housing 23A in the vehicle width direction.

The PCU 24 (power control unit) is disposed on a side opposite to a side at which a load is input when the vehicle 1 collides with an object. In the embodiment, the vehicle 1 colliding with an object means that the vehicle 1 collides with an external object (for example, another vehicle) from the rear (upon rear collision of the vehicle). The PCU 24 is disposed in front of the case 23. That is, the PCU 24 is disposed at a side (a front side) opposite to a side (a rear side) at which a load is input to the case 23 upon rear collision of the vehicle.

The PCU 24 is coupled to the front section of the case 23. The PCU 24 is integrally coupled to the rotating electric machine 21 (electric/mechanical integrated structure). The PCU 24 has a rectangular parallelepiped shape. A length of the PCU 24 in the vehicle width direction is smaller than that of the case 23. The PCU 24 is disposed to straddle the housing 23A and the gear box 23B.

<Brackets 30A and 30B>

As shown in FIG. 3, a pair of left and right brackets 30A and 30B are provided on both sides of the driving device 20. The left and right brackets 30A and 30B are disposed further outward in the vehicle width direction than the PCU 24. The left and right brackets 30A and 30B are a first bracket 30A connected to a left side portion of the case 23 (the housing 23A), and the second bracket 30B connected to a right side portion of the case 23 (the gear box 23B). Hereinafter, the first bracket 30A will be described. Since the second bracket 30B has the same configuration as the first bracket 30A, detailed description thereof will be omitted.

Figure 4:
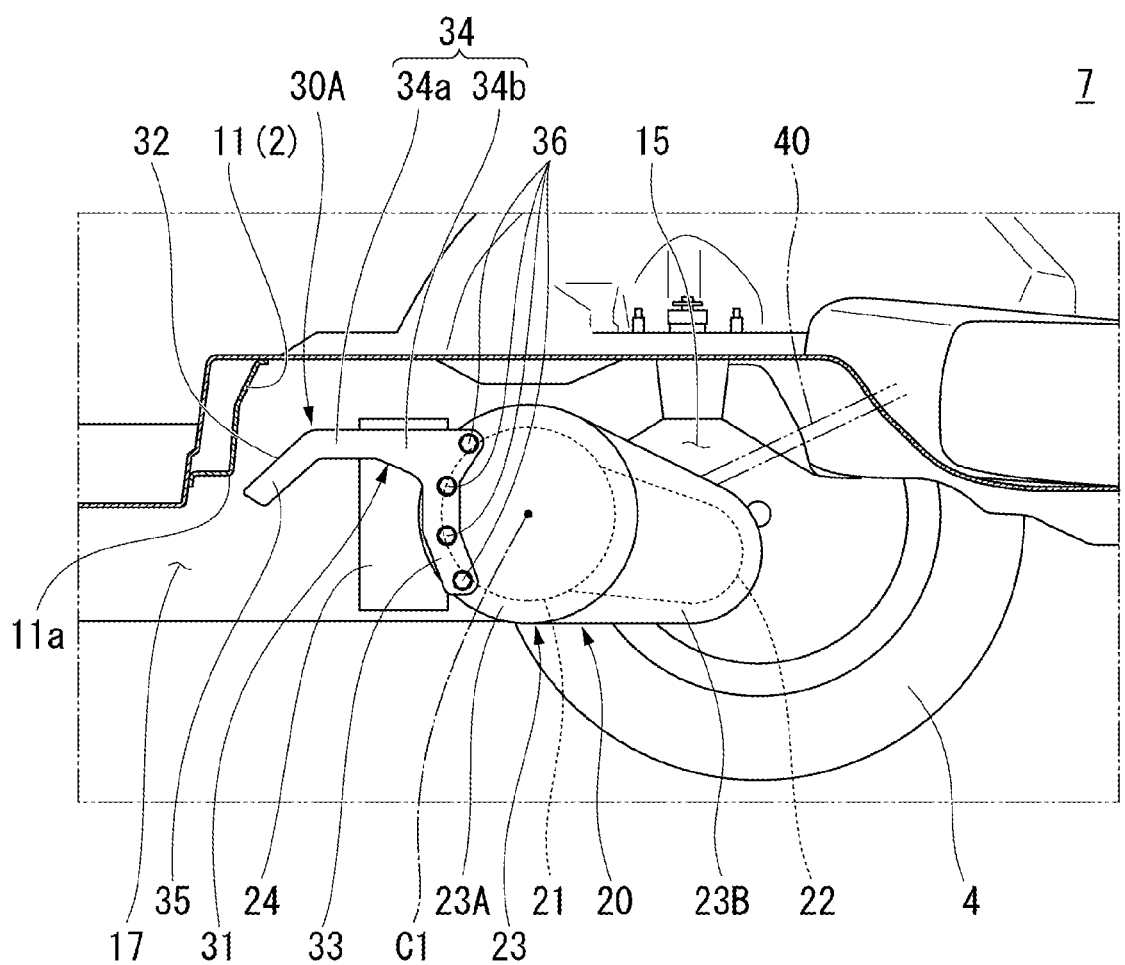
FIG. 4 is a cross-sectional view along line IV-IV in FIG. 2.

As shown in FIG. 4, the first bracket 30A includes a support section 31 provided on the driving device 20, and an impact attenuating section 32 provided on the support section 31. For example, the first bracket 30A is a metal casting.

The support section 31 is able to come in contact with the cross member 11 (a receiving section) upon rear collision of the vehicle. The cross member 11 is a portion that receives an impact from the support section 31 upon rear collision of the vehicle. The cross member 11 is disposed at a position facing the support section 31 in the vehicle forward/rearward direction. The support section 31 is connected to the driving device 20. The support section 31 extends closer to the cross member 11 than the PCU 24. A space section 17 into which the PCU 24 is retractable is provided below the cross member 11.

When seen in a side view, the support section 31 includes an arc-shaped connecting section 33 having a convex arc shape in the front along an outer circumference of the case 23, a first configuration section 34 extending substantially horizontally from an upper end portion (one end portion) of the arc-shaped connecting section 33 to an intermediate section of the support section 31, and a second configuration section 35 extending downward from the intermediate section of the support section 31. The arc-shaped connecting section 33, the first configuration section 34 and the second configuration section 35 are integrally formed of the same member.

The arc-shaped connecting section 33 is connected to a left side portion of the case 23 by a plurality of (for example, in the embodiment, four) bolts 36.

When seen in a side view, the first configuration section 34 includes a linear section 34a extending in a substantially horizontal linear shape, and a tapered section 34b formed in a tapered shape and configured to connect the linear section 34a and the arc-shaped connecting section 33. When seen in a side view, the tapered section 34b has a tapered shape that gradually widens from the rear end portion of the linear section 34a toward the arc-shaped connecting section 33.

The second configuration section 35 is a portion that receives a load in a horizontal direction upon rear collision of the vehicle. The second configuration section 35 has a linear shape extending obliquely forward and downward from the front end portion of the linear section 34a.

The impact attenuating section 32 is a portion provided on the support section 31 and configured to attenuate an impact to the driving device 20 upon rear collision of the vehicle. The impact attenuating section 32 is an inclination section provided in the second configuration section 35 of the support section 31. The impact attenuating section 32 is an inclined side section disposed in the second configuration section 35 on the side of the cross member 11. When seen in a side view, the impact attenuating section 32 has a linear shape extending obliquely forward and downward from a position above a corner section 11a of the cross member 11 to a position below the corner section 11a. A lower end of the impact attenuating section 32 (a front end of the second configuration section 35) is disposed below the corner section 11a of the cross member 11. The impact attenuating section 32 allows a load in the horizontal direction to escape to the space section 17 below the cross member 11 upon rear collision of the vehicle (see FIG. 8).

<Falling Prevention Member 40>

The vehicle 1 may include a falling prevention member 40 configured to prevent the driving device 20 from falling upon rear collision of the vehicle. For example, the falling prevention member 40 is a stay configured to connect the case 23 and the vehicle body (a portion of the vehicle body frame 2 behind the driving device 20). The stay is connected to the case 23 and the vehicle body by a bolt separate from a bolt (not shown) that connects the driving device 20 to the subsidiary frame 12. When seen in a side view, the falling prevention member 40 is inclined forward and downward in the vehicle forward/rearward direction.

<Destruction Mode Upon Rear Collision of Vehicle>

Figure 6:
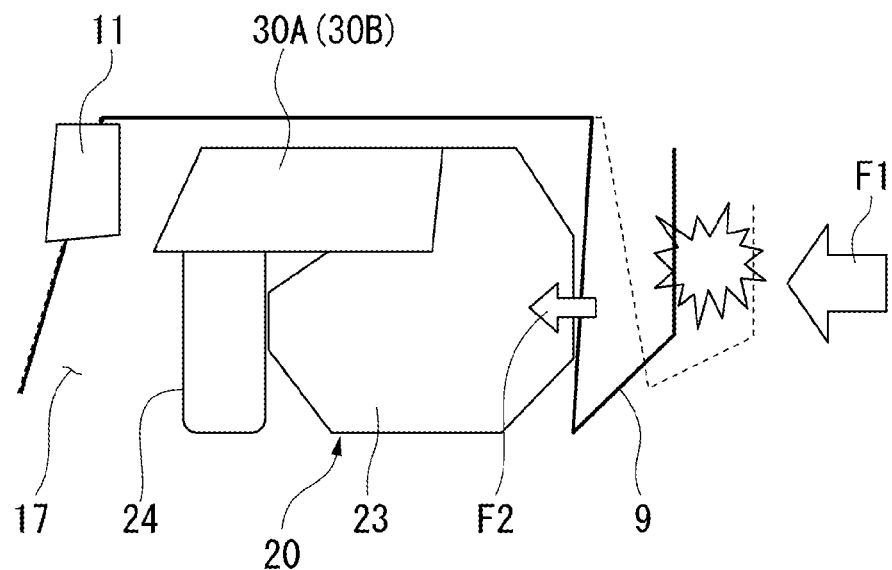
FIG. 6 is a view for describing a destruction mode upon rear collision of the vehicle.
Figure 7:
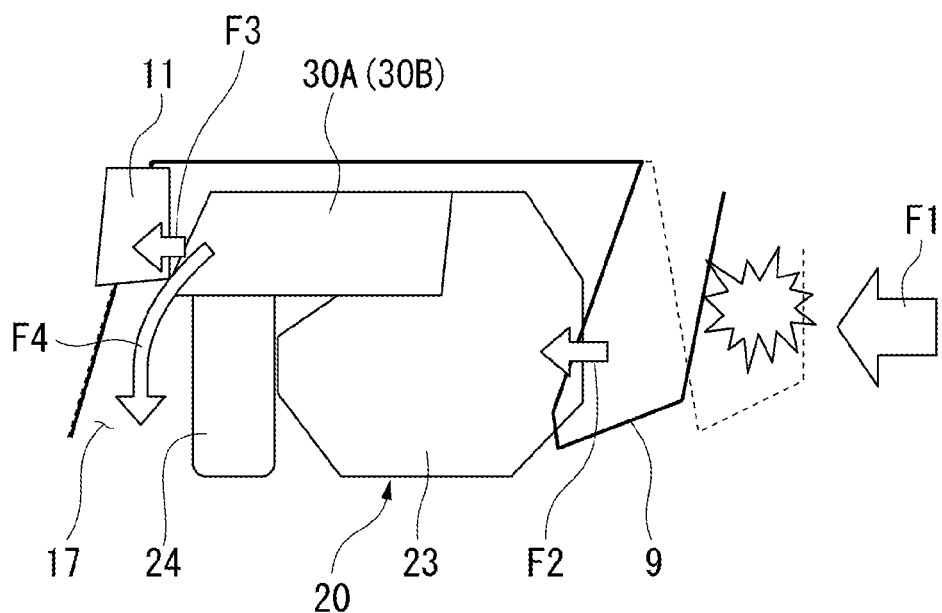
FIG. 7 is a view continuous with FIG. 6 for describing a destruction mode upon rear collision of the vehicle.

FIG. 6 and FIG. 7 are views for describing a destruction mode upon rear collision of the vehicle. In FIG. 6 and FIG. 7, components of the driving device disposition structure are simplified.

As shown in FIG. 6, the rear section of the vehicle receives a load in an arrow F1 direction upon rear collision of the vehicle. Then, a bumper of the rear section of the vehicle 1 is deformed. In the drawing, a bumper 9 after deformation is shown by a solid line, and the bumper 9 before deformation is shown by a broken line. When the bumper 9 is deformed, a load in the forward direction (an arrow F2 direction) is applied to the driving device 20.

As shown in FIG. 7, when the load in the forward direction is applied to the driving device 20, the load in the forward direction (the arrow F2 direction) is applied to the brackets 30A and 30B. Then, the brackets 30A and 30B are displaced toward the cross member 11 in an arrow F3 direction. When the brackets 30A and 30B come in contact with the cross member 11, a force in a forward and downward direction (an arrow F4 direction) is applied to the brackets by actions of inclined side sections of the brackets 30A and 30B. In the embodiment, the brackets 30A and 30B are rigid bodies that are not deformed upon rear collision of the vehicle.

Figure 8:
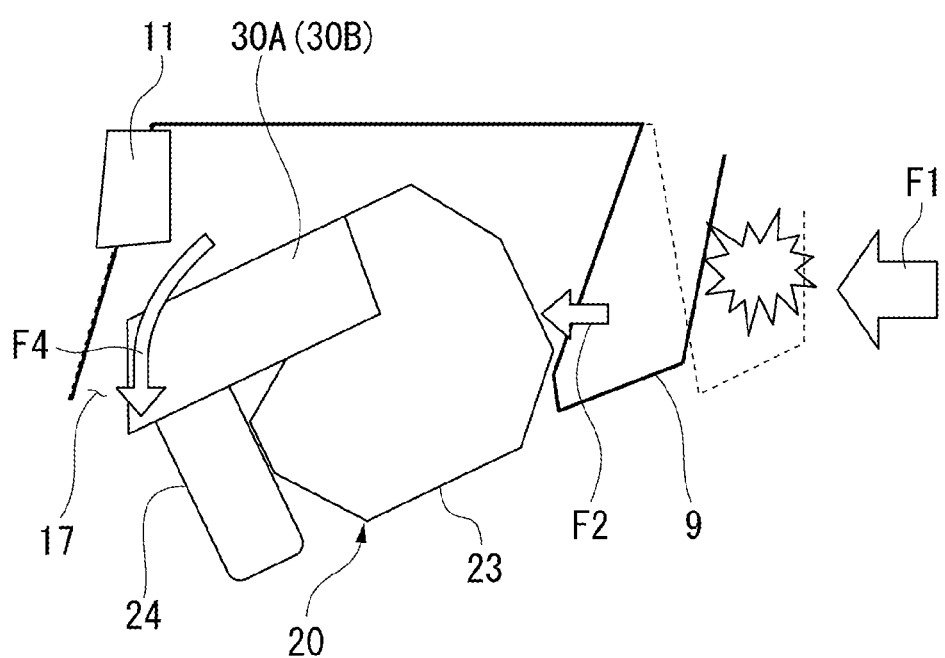
FIG. 8 is a view continuous with FIG. 7 for describing a destruction mode upon rear collision of the vehicle.

As shown in FIG. 8, when a force in a forward and downward direction is applied to the brackets 30A and 30B, the brackets 30A and 30B and the driving device 20 (the PCU 24) are integrally moved forward and downward (in an arrow F4 direction). Accordingly, the PCU 24 is retracted to the space section 17 below the cross member 11. Here, since the load is not directly input to the PCU 24, the PCU 24 can be protected.

Further, after the PCU 24 is retracted to the space section 17, since the driving device 20 is supported by the subsidiary frame 12 (see FIG. 2), the driving device 20 does not fall to the ground. In addition, when the falling prevention member 40 (see FIG. 4) is applied, even though the driving device 20 is separated from the subsidiary frame 12, since the driving device 20 can be prevented from falling, secondary damage such as scattering or the like of the gear box 23B after falling can be prevented.

As described above, the vehicle 1 of the embodiment includes the driving device 20 including the rotating electric machine 21, the case 23 configured to accommodate the rotating electric machine 21 and the PCU 24 disposed on the side opposite to the side at which a load is input when the vehicle 1 collides with an object, disposed in front of the case 23 and configured to supply electric power to the rotating electric machine 21, the support section 31 that is provided on the driving device 20 and able to come in contact with the vehicle body frame 2, and the impact attenuating section 32 provided on the support section 31 and configured to attenuate an impact when the vehicle 1 collides with an object.

According to the configuration, since the support section 31 that is provided on the driving device 20 and able to come in contact with the vehicle body frame 2 and the impact attenuating section 32 provided on the support section 31 and configured to attenuate an impact when the vehicle 1 collides with an object are provided, it is possible to attenuate an impact to the driving device 20 upon collision of the vehicle. In addition, since the driving device 20 includes the PCU 24 disposed on the side opposite to the side at which a load is input when the vehicle 1 collides with an object, it is possible to prevent the load from being directly input to the PCU 24 upon collision of the vehicle. In addition, since the PCU 24 is disposed in front of the case 23, in comparison with the case in which the case 23 and the PCU 24 are arranged in the vertical direction of the vehicle, a height of the driving device 20 can be reduced. Accordingly, the height of the driving device 20 can be reduced while an impact to the PCU 24 upon collision of the vehicle is attenuated.

In the embodiment, since the vehicle body frame 2 includes the cross member 11 configured to receive an impact from the support section 31 when the vehicle 1 collides with an object and the cross member 11 is disposed at a position facing the support section 31, the following effects are exhibited.

Since the impact attenuating section 32 can be actively deformed upon collision of the vehicle, the impact upon collision of the vehicle can be attenuated more.

In the embodiment, since the support section 31 extends closer to the cross member 11 than the PCU 24 while being connected to the driving device 20, the following effect are exhibited.

It is possible to prevent the PCU 24 from colliding with vehicle body upon collision of the vehicle.

In the embodiment, since the support section 31 includes the first configuration section 34 extending from the driving device 20 to the intermediate section of the support section 31 and the second configuration section 35 extending downward from the intermediate section and configured to receive a load in the horizontal direction, the following effects are exhibited.

Since the load in the horizontal direction is input to the second configuration section 35 upon collision of the vehicle, the impact upon collision of the vehicle can be attenuated more. In addition, since the load in the horizontal direction is input to the second configuration section 35 upon collision of the vehicle, when the driving device 20 is rotated and displaced downward, it is possible to prevent the driving device 20 from colliding with the vehicle body frame 2.

In the embodiment, since the vehicle 1 has the space section 17 provided below the cross member 11 and into which the PCU 24 is retractable, the following effects are exhibited. When the driving device 20 is rotated and displaced downward upon collision of the vehicle, the PCU 24 can be protected from the impact by retracting the PCU 24 into the space section 17.

In the embodiment, since the driving device 20 is disposed in the power source accommodating section 15 provided in the rear section of the vehicle 1 and the power source accommodating section 15 is a space between the left and right side frames 10L and 10R of the vehicle 1, the following effects are exhibited.

Since the driving device 20 is disposed in the space between the left and right side frames 10L and 10R of the vehicle 1, a wide luggage room and a wide cabin can be secured. In addition, it is possible for the left and right side frames 10L and 10R to protect the driving device 20 from lateral collision.

In the embodiment, since the driving device 20 is disposed in the power source accommodating section 15 provided in the rear section of the vehicle 1 and the PCU 24 is disposed in front of the case 23, the following effects are exhibited.

In comparison with the case in which the driving device 20 is provided in the front section of the vehicle 1, a weight balance of tires before and after a driver enters the vehicle becomes better. In addition, upon rear collision of the vehicle, it is possible to prevent a load from being directly input to the PCU 24.

In the embodiment, since the housing 23A configured to accommodate the rotating electric machine 21 and the gear box 23B configured to accommodate the gear mechanism 22 are provided and the gear box 23B protrudes rearward than the housing 23A, the following effects are exhibited.

Upon rear collision of the vehicle, since the load can be received by the gear box 23B, it is possible to prevent a load from being directly input to the PCU 24.

In the embodiment, since the rotating electric machine 21 and the PCU 24 are integrally coupled to each other, the following effects are exhibited.

Since the rotating electric machine 21 and the PCU 24 can be connected by a DC line through electric/mechanical integrated structure, in comparison with the case in which the rotating electric machine 21 and the PCU 24 are connected by a three-phase line, it contributes to reduction in costs.

<Variant>

While an example in which the driving device 20 is disposed in the power source accommodating section 15 provided in the rear section of the vehicle 1 and the PCU 24 is disposed in front of the case 23 has been exemplarily described in the above embodiment, there is no limitation thereto. For example, the driving device 20 may be disposed in the power source accommodating section provided in the front section of the vehicle 1, and the PCU 24 may be disposed behind the case 23.

According to this configuration, the height of the driving device 20 can be reduced while an impact to the PCU 24 when the vehicle 1 collides with an external object (for example, another vehicle) from the front (upon front collision of a vehicle) is attenuated.

While an example in which the brackets 30A and 30B are rigid bodies that are not deformed upon rear collision of the vehicle has been exemplarily described in the above embodiment, there is no limitation thereto. For example, the bracket may be deformable upon collision of the vehicle. For example, the bracket may include an impact attenuating section that is deformable. For example, the impact attenuating section may be a bent section provided in the intermediate section of the support section 31, and plastically deformable by the impact upon collision of the vehicle.

According to this configuration, since the bent section is actively plastically deformed upon collision of the vehicle and the impact is absorbed by plastic deformation of the bent section, the impact can be attenuated more upon collision of the vehicle.

Further, an aspect of the impact attenuating section is not limited to the bent section. For example, the impact attenuating section may be a fragile section having a concave section or a thin-walled section in the bracket. For example, the impact attenuating section may be an elastic member such as a spring or the like configured to absorb an impact upon collision of the vehicle.

While an example in which the impact attenuating section 32 is the inclination section provided in the second configuration section 35 of the support section 31 has been exemplarily described in the above embodiment, there is no limitation thereto. For example, the impact attenuating section 32 may be a bent section or a fragile section provided on the bracket in order to allow a load in the horizontal direction to escape in a predetermined direction upon collision of the vehicle.

While an example in which the rotating electric machine 21 is a so-called horizontal type with the rotary axis C1 in the vehicle width direction has been exemplarily described in the above embodiment, there is no limitation thereto. For example, the rotating electric machine 21 may be disposed such that the rotary axis C1 is in the vehicle forward/rearward direction or the vertical direction.

While an example in which the rotating electric machine 21 and the PCU 24 are integrally coupled to each other (an example of electric/mechanical integrated structure) has been exemplarily described in the above embodiment, there is no limitation thereto. For example, the rotating electric machine 21 and the PCU 24 may not be coupled through electric/mechanical integrated structure. For example, the rotating electric machine 21 and the PCU 24 may be provided separately.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle comprising:
    a driving device including:
    a rotating electric machine,
    a case configured to accommodate the rotating electric machine, and
    an electric power conversion device that is disposed on a first side opposite to a second side at which a load is input to the second side when the vehicle collides with an object, that is disposed in front of or behind the case, and that is configured to supply electric power to the rotating electric machine;
    a support section that is provided in the driving device and that is configured to come in contact with a vehicle body of the vehicle; and an impact attenuating section that is provided on the support section and that is configured to attenuate an impact when the vehicle collides with the object, wherein the vehicle body comprises a receiving section configured to receive the impact from the support section when the vehicle collides with the object, wherein the receiving section is disposed at a position facing the support section, wherein, when seen in a side view, the impact attenuating section has a linear shape extending obliquely forward and downward from a first position above a corner section of the receiving section to a second position below the receiving section, and wherein a lower end of the impact attenuating section is disposed below the corner section of the receiving section.

2. The vehicle according to claim 1, wherein the support section extends closer to the receiving section than the electric power conversion device while being connected to the driving device.

3. The vehicle according to claim 1, wherein the impact attenuating section is a bent section that is provided in an intermediate section of the support section and that is plastically deformable by the impact.

4. The vehicle according to claim 1, wherein the support section comprises:

a first configuration section extending from the driving device to an intermediate section of the support section; and a second configuration section extending downward from the intermediate section configured to receive the load in a horizontal direction.

5. The vehicle according to claim 1, wherein the vehicle has a space section provided below the receiving section and into which the electric power conversion device is retractable.

6. The vehicle according to claim 1, wherein the driving device is disposed in a power source accommodating section provided in a front section or a rear section of the vehicle, and the power source accommodating section is a space between left and right side frames of the vehicle.

7. The vehicle according to claim 1, wherein the driving device is disposed in a power source accommodating section provided in a rear section of the vehicle, and the electric power conversion device is disposed in front of the case.

8. The vehicle according to claim 7, wherein the case comprises:

a housing configured to accommodate the rotating electric machine; and a gear box configured to accommodate a gear mechanism, and the gear box protrudes rearward than the housing.

9. The vehicle according to claim 1, wherein the rotating electric machine and the electric power conversion device are integrally coupled to each other.

* * * * *